UNITED STATES PATENT OFFICE.

JOHN H. CROSKEY AND DANIEL C. RIPLEY, OF PITTSBURG, PENNSYLVANIA, ASSIGNORS TO RIPLEY & CO., OF SAME PLACE.

SAND-BLAST STENCIL.

SPECIFICATION forming part of Letters Patent No. 445,241, dated January 27, 1891.

Application filed May 14, 1890. Serial No. 351,774. (No model.)

*To all whom it may concern:*

Be it known that we, JOHN H. CROSKEY and DANIEL C. RIPLEY, of Pittsburg, in the county of Allegheny and State of Pennsylvania, have invented a new and useful Improvement in the Manufacture of Sand-Blast Stencils, of which the following is a full, clear, and exact description.

In the decoration of glassware by the process of sand-blasting it is customary to employ stencils, which are cut out according to the form of the pattern to be produced. The stencil is placed on the surface to be decorated, and when it is submitted to the action of the sand-blast the sand, striking the exposed parts of the glass, produces thereon the desired pattern, the portions of the glass covered by the uncut parts of the stencil being unmarked. The material most commonly employed heretofore in making the stencils has been sheet metal, generally sheet-steel, but the labor and expense involved in cutting out such stencils and shaping them in dies to the shape of the article on which the pattern is to be produced (when such article is circular in surface form or of any form other than flat) is so considerable as to make the sand-blasting process very expensive and of limited practical application. The necessity of making the stencil to fit neatly to the surface of the article and in all the irregular depressions or ridges thereon arises from the fact that if the fit is loose the sand will work its way under the stencil and will blur or spoil the edges of the pattern, and as a stencil can be employed for use in connection with an article of given size and shape only it is necessary, in order to make a set of stencils for articles of different size and shape, to employ as many different dies as there are sizes and shapes to be made.

The object of our invention is to improve the manufacture of stencils for this purpose, so as to render them cheap in cost and better in their fitting on the glass articles than has been possible with the forms of stencils heretofore in common use.

To this end our invention consists in molding on the article to be decorated, or on a form of the same surface outline, a plastic or flexible substance which is of such nature as to accommodate itself accurately to the shape of the article, and impressing on the plastic substance while on the article the outlines of the pattern to be produced; then, by suitable means, causing the said substance to set or become rigid, or partially rigid, so that it shall retain the shape of the article or form, and finally cutting it in the desired pattern. A stencil so produced is of perfect shape, fitting neatly to the glass article in all its surface irregularities, and as it requires no dies to be used in its manufacture its cost is very much less than that of the metal stencils heretofore used.

We first take a glass article of the sort and size desired to be ornamented, or a form of the same shape and size, and mark its surface with the desired pattern. This may be done either by cutting or engraving the pattern on the article or by applying thereto, preferably with adhesive gum, the pattern or parts of the pattern cut out of metal, paper, or other material. We then cover the surface of the article, or so much thereof as is intended to be ornamented, with raw or unvulcanized rubber and press and stretch the same tightly around the article, binding it firmly with wire, or otherwise, care being taken that the rubber is fitted very accurately, so that all the surface irregularities of the article shall be filled or neatly covered and that the rubber shall press firmly against the pattern which was first applied to the glass, as above stated. The glass article or form is then taken, without removing the rubber, and is placed in a rubber-vulcanizing apparatus in which the rubber is vulcanized until it sets or hardens sufficiently to retain permanently the shape to which it has been forced in being applied to the article or form. The article is then removed from the vulcanizing apparatus, the vulcanized and set rubber is removed from it, and there will be formed on the inner surface of the rubber a perfect outline-impression of the pattern which was first applied to the surface of the glass. The rubber is then cut on the lines of this pattern, and when the proper holes or cavities are thus formed therein the stencil is completed, and when applied to glass articles of the same size and shape will fit them neatly, fulfilling all the requisites of a good stencil. If there are any irregularities on the glass article—such, for example, as the beads or ridges common on goblets or tumblers—these ridges, being permanently reproduced in reverse on the stencil, afford means for enabling the stencil to be fitted firmly and in exact position on the articles to be decorated. Besides this, the natural elasticity of the vulcanized rubber allows the stencil to accommodate itself to articles of the same general shape and size, even though they vary a little, as is often the case in glass articles produced from the same mold, and in practice we have found that the rubber is more durable and stands the cutting action of the sand-blast better than any other material known to us, because the fine or sharp edges of the stencil-pattern are not apt to be broken off or bent by the sand, as is the case in the use of metal stencils.

Instead of using rubber as the material for forming the stencil, we may employ other materials of a nature originally plastic or flexible, which may be caused to harden or to set, so as to retain the outline into which they are formed. Thus paper-pulp and other materials may be used for the purpose, though, by reason of its practical efficiency, elasticity, and durability, we deem india-rubber to be the material most suitable for the purpose.

We are aware of English Patent No. 62 of 1878, and do not claim what is therein described.

We claim as our invention—

The hereinbefore-described method of making stencils for sand-blasting, which consists in forming on an article of desired form an outline of the pattern to be made, covering the article and the applied pattern with a plastic or flexible covering, molding the covering to take the impression of the article and of the pattern, hardening the covering on the article, and then cutting out the stencil on the outlines impressed by said pattern, substantially as and for the purposes described.

In testimony whereof we have hereunto set our hands this 12th day of May, A. D. 1890.

J. H. CROSKEY.
     DANIEL C. RIPLEY.

Witnesses:
 W. B. CORWIN,
 THOMAS W. BAKEWELL.